(12) United States Patent
Sarvadevabhatla et al.

(10) Patent No.: US 8,406,925 B2
(45) Date of Patent: Mar. 26, 2013

(54) PANORAMIC ATTENTION FOR HUMANOID ROBOTS

(75) Inventors: Ravi Kiran Sarvadevabhatla, Sunnyvale, CA (US); Victor Ng-Thow-Hing, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 320 days.

(21) Appl. No.: 12/819,032

(22) Filed: Jun. 18, 2010

(65) Prior Publication Data

US 2011/0004341 A1    Jan. 6, 2011

Related U.S. Application Data

(60) Provisional application No. 61/222,243, filed on Jul. 1, 2009.

(51) Int. Cl.
*G05B 15/00* (2006.01)

(52) U.S. Cl. ........................................ 700/259
(58) Field of Classification Search .................. 700/250, 700/259

See application file for complete search history.

(56) References Cited

U.S. PATENT DOCUMENTS

| | | | | |
|---|---|---|---|---|
| 6,535,793 | B2 * | 3/2003 | Allard | 700/259 |
| 6,697,707 | B2 | 2/2004 | Peters | |
| 6,845,297 | B2 * | 1/2005 | Allard | 700/259 |
| 8,111,289 | B2 * | 2/2012 | Zruya et al. | 348/144 |
| 2003/0216834 | A1 * | 11/2003 | Allard | 700/245 |
| 2005/0223176 | A1 | 10/2005 | Peters | |
| 2006/0023105 | A1 * | 2/2006 | Kostrzewski et al. | 348/335 |
| 2006/0075422 | A1 * | 4/2006 | Choi et al. | 725/18 |
| 2009/0080699 | A1 | 3/2009 | Ng-Thow-Hing et al. | |
| 2009/0110292 | A1 | 4/2009 | Fujimura et al. | |
| 2009/0290758 | A1 | 11/2009 | Ng-Thow-Hing et al. | |
| 2009/0323121 | A1 * | 12/2009 | Valkenburg et al. | 358/1.18 |

FOREIGN PATENT DOCUMENTS

WO    WO 2007/120351    10/2007

OTHER PUBLICATIONS

Achim, K., "Image Mapping and Visual Attention on a Sensory Ego-Sphere," *Thesis Submitted to the Faculty of the Graduate School of Vanderbilt University*, Aug. 2005, 106 pages.

Breazeal, C. et al., "Active Vision for Sociable Robots," *IEEE Transactions on Systems, Man, and Cybernetics—Part A: Systems and Humans*, Sep. 2001, vol. 31, pp. 443-453.

Bridgeman, G. et al., "Failure to Detect Displacement of the Visual World During Saccadic Eye Movements," *Vision Research*, 1975, vol. 15, pp. 719-722.

Bur, A. et al., "Robot Navigation by Panoramic Vision and Attention Guided Features," 18th International Conference on Pattern Recognition (ICPR), 2006, vol. 1, pp. 695-698.

(Continued)

*Primary Examiner* — Mary Cheung
*Assistant Examiner* — Michael D Lang
(74) *Attorney, Agent, or Firm* — Fenwick & West LLP; Mark E. Duell

(57) ABSTRACT

A robot using less storage and computational resources to embody panoramic attention. The robot includes a panoramic attention module with multiple levels that are hierarchically structured to process different levels of information. The top-level of the panoramic attention module receives information about entities detected from the environment of the robot and maps the entities to a panoramic map maintained by the robot. By mapping and storing high-level entity information instead of low-level sensory information in the panoramic map, the amount of storage and computation resources for panoramic attention can be reduced significantly. Further, the mapping and storing of high-level entity information in the panoramic map also facilitates consistent and logical processing of different conceptual levels of information.

24 Claims, 5 Drawing Sheets

OTHER PUBLICATIONS

Chun, M., "Contextual Guidance of Visual Attention," *Neurobiology of Attention: Chapter 40*, 2005, pp. 246-250, Itti, Rees and Tsotsos (eds.), ISBN 0123757312, Elsevier Academic Press.

Evangelopoulos, G., "Audiovisual Attention Modeling and Salient Event Detection," *Multimodal Processing and Interaction, Audio, Video, Text: Chapter 8*, 2008, pp. 179-199, Margos, Potamianos and Gros (eds.), ISBN 9780387763156, Springer.

Figueira, D. et al., "From Pixels to Objects: Enabling a Spatial Model for Humanoid Social Robots," *Institute for System and Robotics (ISR)*, 2006, six pages, Lisbon, Portugal.

Itti, L. et al., "A Model of Saliency-based Visual Attention for Rapid Scene Analysis," *IEEE Transactions on Pattern Analysis and Machine Intelligence*, Nov. 1998, vol. 20, pp. 1254-1259.

Itti, L. et al., "Realistic Avatar Eye and Head Animation Using a Neurobiological Model of Visual Attention," *Proceedings SPIE 48th Annual International Symposium on Optical Science and Technology*, Aug. 2003, vol. 5200, pp. 64-78.

Kakumanu, P. et al., "A Survey of Skin-color Modeling and Detection Methods," *Pattern Recognition*, 2007, vol. 40, No. 3, pp. 1106-1122.

Kayama, K. et al., "Panoramic-Environmental Description as Robots' Visual Short-term Memory," *IEEE International Conference on Robotics and Automation (ICRA)*, May 1998, pp. 3253-3258, Leuven, Belgium.

Kayser, C. et al., "Mechanism for Allocating Auditory Attention: An Auditory Saliency Map," *Current Biology*, Nov. 8, 2005, vol. 15, pp. 1943-1947.

Koene, A. et al., "Gaze Shift Reflex in a Humanoid Active Vision System," *Proceedings of the 5th International Conference on Computer Vision Systems*, 2007, ten pages.

McFarlane, N.J.B. et al., "Segmentation and Tracking of Piglets in Images," *Machine Vision and Applications*, 1995, vol. 8, No. 3, pp. 187-193.

Moren, J. et al., "Biologically Based Top-down Attention Modulation for Humanoid Interactions," *International Journal of Humanoid Robotics (IJHR)*, 2008, vol. 5, No. 1, pp. 3-24.

Mutlu, B. et al., "Footing in Human-Robot Conversations: How Robots Might Shape Participants Roles Using Gaze Cues," *Proceedings of the 4th International Conference on Human-Robot Interaction*, 2009, pp. 61-68.

Navalpakkam, V. et al., "Modeling the Influence of Task on Attention," *Vision Research*, 2005, vol. 45, No. 2, pp. 205-231.

Ng-Thow-Hing, V. et al., "Cognitive Map Architecture: Facilitation of Human-Robot Interaction in Humaoid Robots," *IEEE Robotics and Automation Magazine*, Mar. 2009, vol. 16, No. 1, pp. 55-66.

Nickel, K. et al., "Fast Audio-Visual Multi-Person Tracking for a Humanoid Stereo Camera Head," *IEEE-RAS 7th International Conference on Humanoid Robots*, 2007, pp. 434-441, Pittsburg, PA, USA.

Nothdurft, H.-C., "Salience of Feature Contrast," *Neurobiology of Attention: Chapter 38*, 2005, pp. 233-239, Itti, Rees and Tsotsos (eds.), ISBN 0123757312, Elsevier Academic Press.

Nozawa, Y. et al., "Humanoid Robot Presentation Controlled by Multimodal Presentation Markup Language MPML," *Proceedings of the 13th International Workshop on Robot and Human Interactive Communication*, 2004, pp. 153-158.

Okita, S. et al., "Learning Together: ASIMO Developing an Interactive Learning Partnership with Children," *18th IEEE International Symposium on Robot and Human Interactive Communication*, 2009, pp. 1125-1130, Toyama, Japan.

Oliva, A., "Gist of the Scene," *Neurobiology of Attention: Chapter 41*, 2005, pp. 251-256, Itti, Rees and Tsotsos (eds.), ISBN 0123757312, Elsevier Academic Press.

Parkhurst, D. et al., "Stimulus-Driven Guidance of Visual Attention in Natural Scenes," *Neurobiology of Attention: Chapter 39*, 2005, pp. 240-245, Itti, Rees and Tsotsos (eds.), ISBN 0123757312, Elsevier Academic Press.

PCT International Search Report and Written Opinion, PCT Application No. PCT/US2010/039683, Sep. 3, 2010, five pages pages.

Pizer, S.M. et al., "Contrast-limited Adaptive Histogram Equalization: Speed and Effectiveness," *Proceedings of the First Conference on Visualization in Biomedical Computing*, 1990, pp. 337-345.

Rapantzikos et al., "An Audio-Visual Saliency Model for Movie Summarization," *IEEE 9th Workshop on Multimedia Signal Processing (MMSP)*, 2007, pp. 320-323.

Ruesch, J. et al., "Multimodal Saliency-Based Bottom-Up Attention a Framework for the Humanoid Robot iCub," *IEEE International Conference on Robotics and Automation (ICRA)*, May 19-23, 2008, pp. 962-967, Pasadena, California, USA.

Stiehl, W.D., et al., "The Huggable: A Platform for Research in Robotic Companions for Elder Care," *In Proceedings of AAAI Fall Symposium, Technical Report FS-08-02*, 2008, seven pages, The AAAI Press, Menlo Park, California, USA.

Wikipedia.Org, "Saccade." [Online] [Retrieved on Nov. 23, 2010] Retrieved from the Internet <URL:http://en.wikipedia.org/wiki/Saccade>.

Witkowski, M. et al., "A Model of Modes of Attention and Inattention for Artificial Perception," *Bioinspiration & Biomimetics*, 2007, vol. 2, No. 3, thirty-two pages.

Yavari, A. et al., "Visual Attention in Foveated Images," *Advances in Computer and Information Sciences and Engineering*, 2008, ISBN 9781402087417, pp. 17-20, T. Sobh (ed.), Springer.

Zetzsche, C., "Natural Scene Statistics and Salient Visual Features," *Neurobiology of Attention: Chapter 37*, 2005, pp. 226-232, Itti, Rees and Tsotsos (eds.), ISBN 0123757312, Elsevier Academic Press.

\* cited by examiner

PANORAMIC ATTENTION FOR HUMANOID ROBOTS

CROSS-REFERENCE TO RELATED APPLICATIONS

This application claims priority under 35 U.S.C. §119(e) to co-pending U.S. Provisional Patent Application No. 61/222,243 entitled "Panoramic Attention for Humanoid Robots," filed on Jul. 1, 2009, which is incorporated by reference herein in its entirety.

FIELD OF THE INVENTION

The present invention is related to a method and system for providing attention mechanism in humanoid robots, more specifically to a method and system for implementing panoramic-like attention mechanism in humanoid robots.

BACKGROUND OF THE INVENTION

Studies indicate that humans employ attention as a mechanism for preventing sensory overload. Similar attention mechanism may be employed in humanoid robots to afford intelligent perception and response based on sensing of their surroundings. There are at least two aspects to the attention in the context of humanoid robots. First, 'perception' describes how to design a sensory system to extract useful sensory features from sensor signals, and perform subsequent processing to perform tasks such as face recognition. Second, 'behavioral response' defines how the humanoid robots should act when they encounter the salient features. The attention mechanism may enable the humanoid robots to achieve 'perception' and 'behavior response' to achieve a semblance of liveliness that goes beyond exhibiting mechanical repertoire of responses.

In most humanoid robots, sensors (e.g., cameras) cover a limited sensory field of their environments. Hence, the humanoid robots can perceive only a small subset of their environment at a certain time. To change the sensory field being covered, the humanoid robots move their platforms or components (e.g., head) into a different configuration. Panoramic attention enables the humanoid robots to retain information previously received from sensors by mapping information received from sensors to a panoramic map.

The panoramic attention may require extensive high storage and computation resources, especially to accommodate real-time operations of humanoid robots. The information received from the sensors may be extensive in size, and hence, a large amount of processing and prolonged time may be needed to perform any useful operations based on the stored information.

SUMMARY OF THE INVENTION

Embodiments of the present invention relate to a robot that detects the entities and maps the detected entities to locations relative to the robot. The robot extracts low-level features from a sensor signal, and processes the features to determine portions of the sensor signal likely to include one or more entities of interest. The portions of the sensor signal are then processed to detect the entities. For each detected entity, entity information indicating characteristics of the detected entity is generated. The locations of the detected entities relative to the robot are determined. Based on the locations and the entity information of the entities, the robot plans and performs an action.

In one embodiment, the robot further maps the detected entities to locations in a panoramic map. The panoramic map is at least partially surrounding the robot and indicates the locations relative to the robot. The location of each of the detected entity is represented by coordinates in the panoramic map. A spherical coordinate system may be used with the panoramic map to identify the locations of the entities.

In one embodiment, each entity is associated with an activation signal. The activation signal represents confidence or probability that the entity information and the location of the detected entity remain valid. The activation signal of a previously detected entity decreases with progress of time while a sensory field of the sensor does not cover the previously detected entity.

In one embodiment, the robot further stores the trace of detected entity that indicates changes in the location of the detected entity with progress of time. The activation signal may be decreased at different rates for different types of entities.

In one embodiment, the robot is controlled to move effectors to include a location of an entity previously detected in a sensory field of the sensor when an event associated with the previously detected entity is detected.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
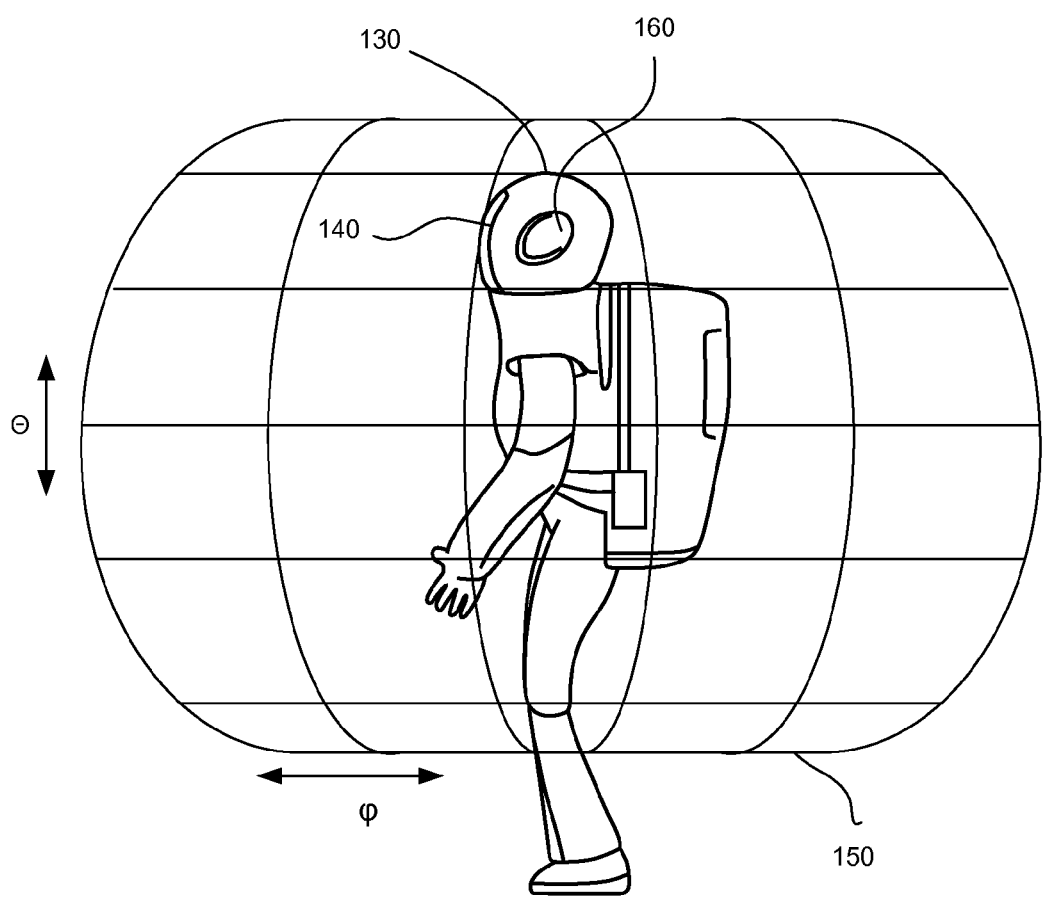
FIG. 1 is a diagram illustrating a humanoid robot placed within a panoramic map, according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments relate to a robot that uses less storage and computational resources to embody panoramic attention. The robot includes a panoramic attention module that has multiple levels to perform hierarchical processing of information. The lowest level of the panoramic attention module detects low-level features in a sensor signal. The mid-level of the panoramic attention module detects entities based on the features detected in the lowest level. The top-level of the panoramic attention module receives information about entities and maps the entities to a panoramic map maintained by the robot. By mapping and storing high-level entity information instead of low-level sensory information in the panoramic map, the amount of storage and computation resources for panoramic attention can be reduced significantly. Further, the mapping and storing of high-level entity information in the panoramic map also facilitates consistent and logical processing of different conceptual levels of information.

An entity herein refers to any objects or persons that are of interest. The entity may be detected by processing a sensor signal received from a sensor.

A feature herein refers to low-level characteristics in different parts or portions of a sensor signal. Features related to images may include, for example, intensity, colors, motions and orientations. Features related to sounds may include, for example, pitch, intonation, and fundamental frequency.

Entity information herein refers to information related to a detected entity. The entity information is high-level information derived from low-level features. Entity information about a face, for example, may include: the orientation of a detected face, identity of the face as detected by facial recognition, the location of the face, and the facial expression. Entity information about an object, for example, may include: the type of the object (e.g., a chair or a desk), and the size of the object. The entity information may also include location of the detected entity.

A sensory field herein refers to the spatial coverage of a sensor. A sensor has capability to sense physical properties of an object or environment within limited spatial coverage but is incapable or yields poor sensory results beyond the limited spatial coverage. Alternatively, the sensory field may be artificially established by a user. In an image capturing device (e.g., a camera), for example, the sensory field may be referred to as a field of view.

An idle mode of a robot herein refers to a mode of the robot where the robot is not operating to achieve a specific goal other than detecting, recognizing or mapping entities or environment around the robot.

A facing location of a robot is a location that a specific sensor of the robot is facing. The facing location may be a location corresponding to the center of a sensory field. In a humanoid robot, for example, the facing location indicates a location in front of a camera installed on the robot.

Overview of Robot Employing Panoramic Attention

FIG. 1 illustrates a humanoid robot 130 employing panoramic attention, according to one embodiment of the present invention. The humanoid robot 130 has a head assembly including at least one camera 140 and two microphones 160. The head assembly of the humanoid robot 130 can be panned for a fixed angle (e.g., 85 degrees to the right and 85 degrees to the left, covering a total of 170 degrees) and tilted for a fixed angle (e.g., 15 degrees up and 10 degrees down) to face different directions and capture images of different fields of view. The robot 130 may also walk so that its body faces a different direction. By walking and turning the head assembly, the robot 130 may capture images for an entire 360 degrees of view. In one embodiment, the robot 130 is advanced humanoid robot of Honda Motor Co., Ltd., Tokyo, Japan.

The humanoid robot 130 employs a coordinate system for mapping various entities surrounding the robot 130 as processed by a panoramic attention module described below in detail with reference to FIG. 2. In one embodiment, the coordinate system is a spherical coordinate system where a location is specified by an azimuth angle $\phi$ and an inclination angle $\theta$. The coordinate system is local to the robot 130 and is centered on the body of the robot 130. In one embodiment, coordinates of entities are adjusted when the robot rotates its body. Lines 150 represent gridlines for the spherical coordinate system.

The spherical coordinate system is merely illustrative and other coordinate systems such as Cartesian coordinate system and polar coordinate system can also be used. Also, a global coordinate system may be employed to track the location of the entities so that the coordinates of the entities are maintained even if the robot 130 makes translational movement. Further, depth information may be employed to indicate three dimensional coordinates of the entities. For example, distance d to the entity in addition to an azimuth angle $\phi$ and an inclination angle $\theta$ may be used to identify the location in a spherical coordinate system. For this purpose, the robot 130 may include a sensor (e.g., depth camera) for detecting distance to the entity.

The humanoid robot 130 detects entities using one or more sensors (e.g., the camera 140 and the microphone 160) and maps the entities to the coordinate system. Based on the mapped entities, the humanoid robot 130 can set goals, remove goals, and maintain goals. The humanoid robot 130 can modify its internal operation states or operate actuators to achieve the outstanding goals.

Although embodiments are described herein with reference to a humanoid robot, the panoramic attention and its operational principle are not limited to humanoid robots. The panoramic attention and operations of the robot can be applied to non-humanoid robots or computing devices that interact with humans.

Example Architecture of Robot

Figure 2:
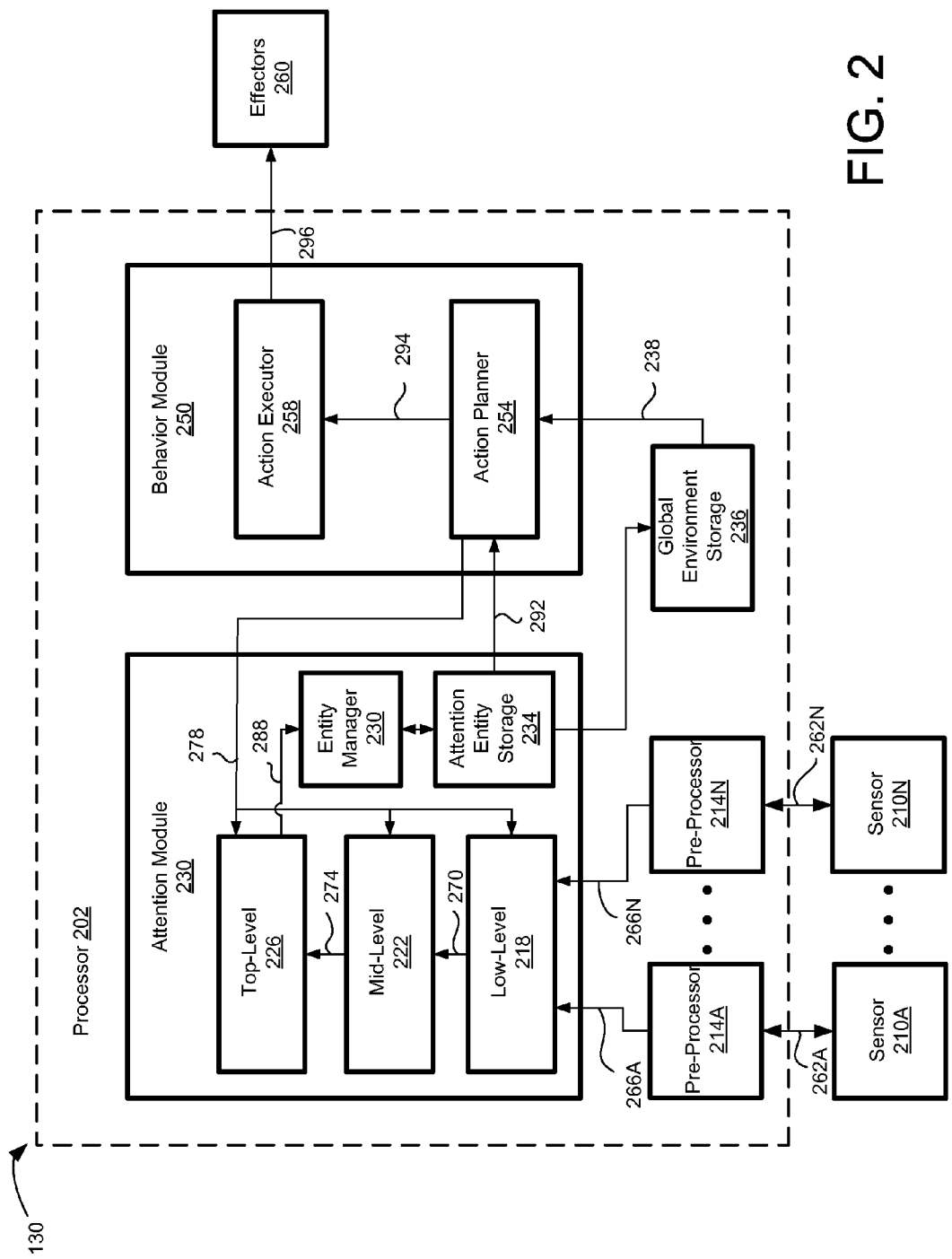
FIG. 2 is a block diagram illustrating a humanoid robot, according to one embodiment of the present invention.

FIG. 2 is a block diagram of a robot 130 employing panoramic attention, according to one embodiment of the present invention. The robot 130 detects and recognizes entities surrounding the robot 130 and causes physical changes in its environment or changes its mode of operation. In one embodiment, the robot 130 operates in two or more modes, one of which is an idle mode. Other modes of the robot 130 may be designed to achieve a certain goal, such as walking to a destination or picking up an object.

The robot 130 may include, among other components, sensors 210A through 210N (hereinafter referred to as "the sensor 210"), a processor 210, and effectors 260. The sensors 210 detect various physical properties and convert the detected physical properties to sensor signals 262A through 262N (hereinafter collectively referred to as "the sensor signals 262"). Example sensors 210 include cameras, microphones and depth sensors. The robot 130 may include sensors having a limited sensory field such as a camera or a directional microphone.

The processor 202 performs various computations associated with, for example, processing the sensor signals 262, detecting entities in the environment of the robot 202, planning actions and sending out commands 296 to activate the effectors 260. In one embodiment, the processor 202 is embodied as hardware, firmware, software or a combination thereof. The hardware of the processor 202 may include, for example, a central processing unit, memory, an input module, a communication module, an output module and a bus connecting these components.

The effectors 260 receive the commands 296 from the processor 202 and effect physical changes in the robot 130 and/or its environment. The effectors 260 may include various actuators such as electronic motors, hydraulic circuit components (e.g., pumps, valves and cylinders), speakers and display devices.

The processor 202 may include, among other components, pre-processors 214A through 214N (hereinafter collectively referred to as "the pre-processors 214"), an attention module 230, a global environment storage 236 and a behavior module 250. The pre-processors 214 process the sensor signals 262 into processed sensor signals 266A through 266N (hereinafter collectively referred to as "the sensor signals 266") to facilitate further processing at the attention module 230. The processing at the pre-processors 214 may include, among others, reducing resolution of the image, removing noise, enhance color contrast (e.g., by applying CLAHE (Contrast-Limited Adaptive Histogram Equalization)), rectify distortions in the sensor signals due to characteristics of the sensors 210, and amplify certain physical properties in the sensor signals. In one embodiment, the pre-processor 214 associated with a camera rectifies raw images to eliminate spherical distortion.

The global environment storage 236 stores information about the environment surrounding the robot 130. Information stored in the global environment storage 236 may include, for example, any information about the environment previously provided and entity information generated at the attention module 230. The entity information indicates entities and their locations in a panoramic map. The information stored in the global environment storage 236 may be accessed by other components of the robot 130 to analyze environment, plan an action, or predict the consequences of an action.

Example Architecture of Attention Module

The attention module 230 receives the processed sensor signals 266, detects any entities from the processed sensor signals 266, and then maps the detected entities to locations relative to the robot 130 according to a coordinate system. Instead of retaining and mapping all the information related to the detected entities, the attention module 230 extracts high-level information about the detected entities, and stores only the high-level information. Low-level features used for deriving or detecting the entities are not stored or selectively stored, and hence, memory resources needed to detect and store entities in the context of panoramic attention may be reduced. The stored information may also be updated or modified, for example, as time elapses, events are detected or information about other entities is received.

The attention module 230 may include, among other components, a top-level sub-module 226, a mid-level sub-module 222, a low-level sub-module 218, an entity manager 230, and an attention entity storage 234. Each of the modules in the attention module 230 may be embodied as hardware, software, firmware or a combination thereof. Also, multiple sub-modules may be combined into a single module. For example, the entity manager 230 may be combined with the top-level sub-module 226 into a single sub-module. Alternatively, a sub-module may be divided into multiple sub-modules to perform more defined functions.

The low-level sub-module 218 detects low-level features in the processed sensor signals 266. Taking an example of processing a visual image, the low-level sub-module 218 detects salient visual features using one or more feature detectors, as described below in detail with reference to FIG. 3. The low-level sub-module 218 generates saliency maps 270 provided to the mid-level sub-module 222. A saliency map described herein refers to a map indicating locations or areas that are likely to include an entity of interest. In one embodiment, the mid-level sub-module generates multiple saliency maps 270 for a single unit of sensor signal. Each of the multiple saliency maps 270 is customized for detecting a different entity, as described below in detail with reference to FIG. 4.

The mid-level sub-module 222 detects entities based on the saliency maps 270 received from the low-level sub-module 218. The mid-level sub-module 222 may include one or more entity detectors for detecting one or more types of entities, as described below in detail with reference to FIG. 4. In one embodiment, the mid-level sub-module 222 processes limited areas as identified by a saliency map 270 to generate entity information 274. The entity information 274 includes information about detected entities.

The entity information 274 may include, but is not limited to, information about the type of entity, the location of the entity, properties of the entity and basis for selecting the limited area for processing (e.g., what the selected area of the saliency map 270 represent). For example, entity information for a human face may indicate that (i) the size of the face, (ii) the orientation of a detected face, (iii) identity of the face as detected by facial recognition, (iv) the location of the face, (v) the facial expression, and (vi) predicted direction of movement of the entity relative to the robot 130).

The top-level sub-module 226 receives the entity information 274 from the mid-level sub-module 222 and maps entities to the locations on a panoramic map, as described below in detail with reference to FIG. 5A. The panoramic map enables the detected entities to be mapped relative to the robot 130. In one embodiment, the panoramic map identifies two-dimensional locations of the detected entities using a combination of inclination angle and azimuth angle in a spherical coordinate system. In another embodiment, the panoramic map identifies three-dimensional locations of the detected entities by including depth information in addition to the inclination and azimuth angles.

In one embodiment, the top-level sub-module 226 performs clustering of entities. If similar or the same entity information relative to previously generated entity information is received from the mid-level sub-module 222 over a period of time, the top layer sub-module 226 clusters the entities identified by the similar or the same entity information into a single entity. Especially, if the locations of entities are proximate between the entities represented by similar entity information, the top-level sub-module 226 may regard the different sets of entity information as being caused by the same entity. By clustering and mapping entities of different entity information to the same entity, the top-level sub-module 226 may detect and track an entity in a reliable and stable manner despite the movement of the entity or inaccuracy associated with sensors. For clustered entities, the entity information of a previously detected entity can be updated instead of creating new entity information.

The top-level sub-module 226 sends mapping information 288 to the entity manager 230. For each detected entity, the mapping information 288 includes, among other information, the entity information 274 and the mapped location of the entity in a panoramic map. In one embodiment, the mapping information 288 further includes changes in the entity information 274 over time. For example, the mapping information 288 may indicate changes in the location of an entity (e.g., a face) or changes in the properties of the entity (e.g., facial expression) over time. In another embodiment, the mapping information 288 includes selected data fields of the entity information 274 depending on the context of operation (e.g., operation mode).

The entity manager 230 receives the mapping information 288 and stores the mapping information in the attention entity storage 234. The attention entity storage 234 stores entity information derived in the attention module 230. Contrast this with the global environment storage 236 that stores information about environment that is collected from the attention module 230 as well as other components of the robot 130 such as input device (receiving information from user).

The entity manager 230 also enforces decaying function that gradually decreases an activation signal associated with an entity. The activation signal referred to herein represents the confidence or probability that the last detection of an entity is still valid. When an entity is initially detected, the activation signal is set to an initial value (e.g., initial value equals 1), but the activation signal is gradually decreased after the entity moves outside the sensory field of the robot 130 as the robot 130 moves. For example, when a face is first captured by a camera at a location, the activation signal is set to 1. But as the camera or the body of the robot moves, causing the face to move outside the field of view, the activation signal is slowly decayed to a value less than 1 to represent that the face is less likely to be at the same location with progress of time.

In one embodiment, the following decay function is used:

$$\alpha = \exp(-t/\tau) \quad (1)$$

where t represents time passed since the previous observation and τ represents a decay rate. A smaller decay rate causes the activation signal to decay at a faster rate. In one embodiment, different decay rates τ are set for different entities. Faces, hands or other moving objects are unlikely to stay at the same location for a prolonged time. Hence, objects prone to movements are assigned smaller decay rates, causing the associated activation signal to decay at a faster rate. Tables, houses or other stationary objects are likely to stay at the same location for a longer time. Hence, such stationary objects are assigned higher decay rates, causing the activation signal to decay at a slower rate. In one embodiment, an activation signal is assigned to each entity and stored in the attention entity storage 234.

Saliency Map Generation and Entity Detection

Figure 3:
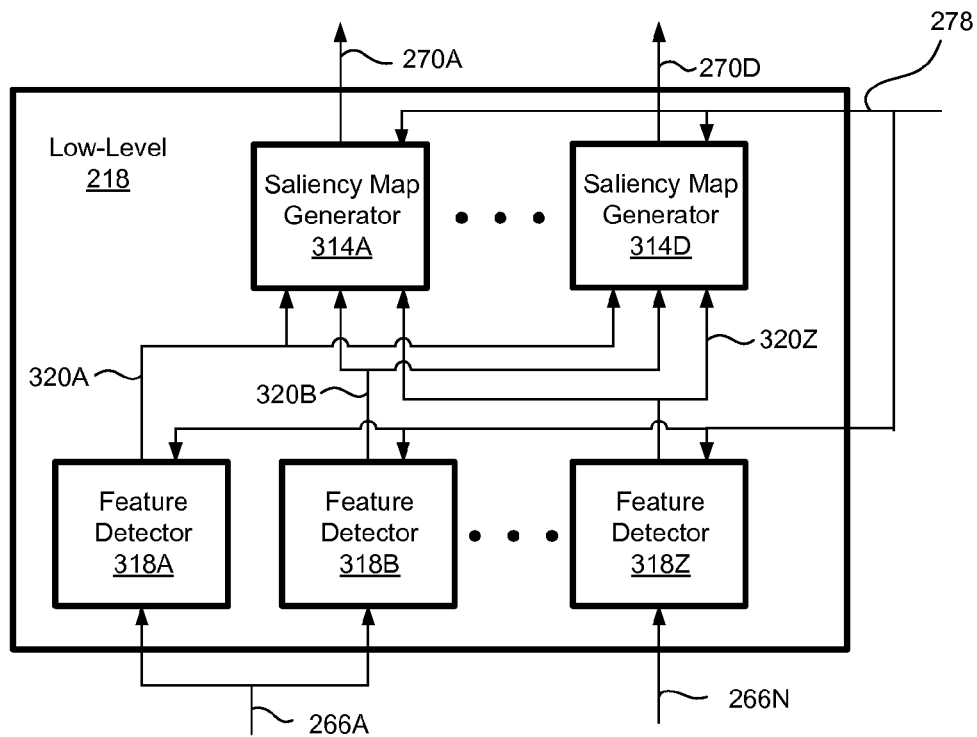
FIG. 3 is a block diagram of a low-level sub-module of an attention module, according to one embodiment of the present invention.

FIG. 3 is a block diagram of the low-level sub-module 218, according to one embodiment of the present invention. The low-level sub-module 218 may include, among other components, one or more feature detectors 318A through 318Z (hereinafter collectively referred to as "the feature detectors 318") and one or more saliency map generators 314A through 314D (hereinafter collectively referred to as "the saliency map generators 314"). Each of the feature detectors 318 receives one or more of the processed sensor signals 266, and detects features in the processed sensor signals 266. Different feature detectors 318 may receive different sensor signals 266. For example, the feature detectors 318A and 318B may receive a visual image captured by the camera 140 while the feature detector 318Z may receive an audio signal generated by the microphones 160. Each feature detector 318 generates a feature map 320 that is fed to one or more saliency map generators 314.

More specifically, each of the feature detectors 318 detects a predetermined feature in the sensor signals 266. Taking an example where the sensor signal 266A includes a stream of images, each of the multiple feature detectors 318 may perform one or more of the following functions to generate corresponding feature maps: (i) light intensity detection, (ii) detection of colors, (iii) motion detection, (iv) detection of a single color or spectrum (e g, skin color), (v) detection of orientations of image features, and (vi) detecting distance to various objects in the environment.

An example of generating a set of feature maps for a visual image is described herein. In this example, the low-level sub-module 218 includes at least three feature detectors, one for detecting intensity (TF), another for detecting color (CF), and the third feature detector for detecting orientations (OF). First, intensity image I is obtained by the following equation:

$$I=(r+g+b)/3 \tag{2}$$

where r, g and b represent red, green and blue channels of the input image, respectively. I is used to create a dyadic Gaussian pyramid $I(\sigma)$ where $\sigma \in [0, \ldots, 8]$ representing the scale. The red, green and blue channel may be normalized by I in order to decouple hue from intensity. Then four broadly tuned color channels are created for red, green, blue and yellow colors using the following equations:

$$\text{Red: } R=r-(g+b)/2 \tag{3}$$

$$\text{Green: } G=g-(r+b)/2 \tag{4}$$

$$\text{Blue: } B=b-(r+g)/2 \tag{5}$$

$$\text{Yellow: } Y=(r+g)/2-|r-g|/2-b \tag{6}$$

Four Gaussian pyramids $R(\sigma)$, $G(\sigma)$, $B(\sigma)$ and $Y(\sigma)$ are created from these four colors.

Six primary maps T(c, s) are obtained by the following equation:

$$T(c,s)=|I(c) \ominus I(s)| \tag{7}$$

where $c \in \{2, 3, 4\}$, $s=c+\delta$, $\delta \in \{3, 4\}$, and $\ominus$ refers to a center-surround operation. A center-surround operation $(\ominus)$ is a difference between a fine scale map and a coarse scale map adjusted for difference in the scales. More specifically, the center-surround operation $(\ominus)$ is obtained by interpolating the coarse scale map into a modified map having the same scale as the fine scale map, and then performing point-by-point subtraction against the fine scale map. A second set of primary maps is similarly constructed for the color channels. Primary maps RG(c, s) and maps BY(c, s) are created using the following equation:

$$RG(c,s)=|(R(c)-G(c))\ominus(G(s)-R(s))| \tag{8}$$

$$BY(c,s)=|(B(c)-Y(c))\ominus(Y(s)-B(s))| \tag{9}$$

A total of 12 primary maps for color are created. Primary orientation maps are obtained from Gabor pyramids $O(\sigma, \theta)$ where $\sigma \in [0, \ldots, 8]$ represents the scale and $\theta \in \{0°, 45°, 90°, 135°\}$ is the preferred orientation. 24 Orientation primary maps $O(c, s, \theta)$ are obtained by the following equation:

$$O(c,s,\theta)=|O(c,\theta)\ominus O(s,\theta)| \tag{10}$$

In total 42 primary maps are computed: 6 for intensity, 12 for color and 24 for orientation.

The feature maps TF (for intensity), CF (for color) and OF (for orientation) are obtained by combining the primary maps according to the following equations:

$$TF = \bigoplus_{c=2}^{4} \bigoplus_{s=c+3}^{c+4} N(I(c, s)) \tag{11}$$

$$CF = \bigoplus_{c=2}^{4} \bigoplus_{s=c+3}^{c+4} [N(RG(c, s)) + N(BY(c, s))] \tag{12}$$

$$OF = \sum_{\theta \in \{0°, 45°, 90°, 135°\}} N\left(\bigoplus_{c=2}^{4} \bigoplus_{s=c+3}^{c+4} N(O(c, s, \theta))\right) \tag{13}$$

where N represents a map normalization operator normalizing the values in a map to a fixed range, and $\oplus$ represents a function that reduces each map to scale 4 and point-by-point addition.

The saliency map generators 314 receive two or more feature maps generated at the feature detectors 318. The saliency map generators 314 combine the two or more feature maps they receive and generate the salience maps 270A through 270D (hereinafter collectively referred to as "the saliency maps 270"). Each of the saliency map generators 314 may receive different sets of feature maps 320 and assign different weights to each feature map 320 to obtain a saliency map 270. In the example described above in detail with reference to equations (2) through (13), a saliency map S may be generated using the following equation:

$$S=\tfrac{1}{3} \times \{N(TF)+N(CF)+N(OF)\} \tag{14}$$

The saliency S indicates the areas of significance that are likely to include entities for detection by the mid-level sub-module 222.

Although the feature maps and the saliency maps are described above with reference to images, the feature maps and saliency maps are not limited to images captured by an imaging sensor. The feature maps may be generated by processing sensor signals 266 from other sensors such as microphones 160. Using a localizing algorithm know in the art, the source of the acoustic signals may be identified. A feature map may indicate the location of sound determined by the localizing algorithm.

In one embodiment, the saliency map generators 314 and the feature detectors 318 may be embodied as plug-in software components. The saliency map generators 314 and the feature detectors 318 may be designed specifically for certain purposes. The saliency map generators 314 and the feature detectors 318 may be installed in the processor 202 to expand the capability of the robot 130. The saliency map generators 314 and the feature detectors 318 can also be removed without affecting other functional components in the low-level sub-module 218 to make resources available for other plug-in software components.

Figure 4:
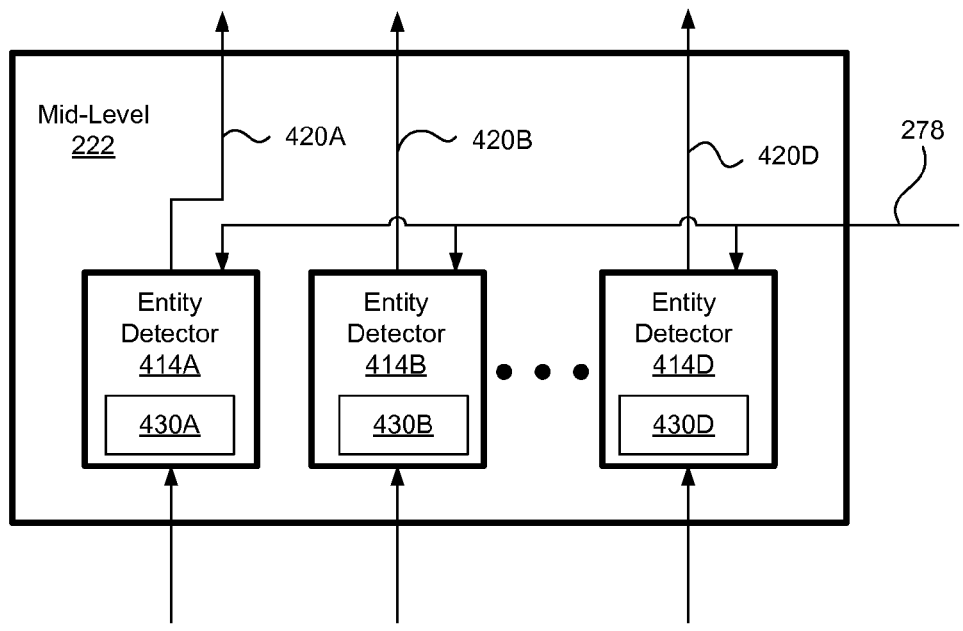
FIG. 4 is a block diagram of a mid-level sub-module of an attention module, according to one embodiment of the present invention.

FIG. 4 is a block diagram of the mid-level sub-module 222, according to one embodiment of the present invention. The mid-level sub-module 222 may include, among other components, multiple entity detectors 414A through 414D (hereinafter collectively referred to as "the entity detectors 414"). The entity detectors 414 include algorithms 430A through 430D, each of which are specifically designed to detect one or more types of entities.

The entity detectors 414 may include software, firmware, hardware or a component thereof for executing the algorithms 430. Each of the entity detectors 414 is specialized to receive a saliency map 270 and detect an entity by processing the saliency map 270 or processing part of the sensor signals 266 or 262 (e.g., part of an image) identified by the saliency map 270. By processing a part of the sensor signal instead of the entire sensor image, entities in the sensor signals can be detected more efficiently.

For example, the saliency map 270 associated with an image may indicate regions of interest (ROI) that are likely to include human faces. An entity detector (e.g., the entity detector 414A) for detecting the human face may determine the ROI and apply a face detection algorithm only to the portion of the image corresponding to the ROI identified by the saliency map 270.

In one embodiment, the entity detectors 414 use techniques disclosed, for example, in U.S. patent application Ser. No. 12/124,016, entitled "Rectangular Table Detection Using Hybrid RGB and Depth Camera Sensors," filed on May 20, 2008; U.S. patent application Ser. No. 11/925,557, entitled "Hand Sign Recognition Using Label Assignment," filed on Oct. 26, 2007; and U.S. patent application Ser. No. 12/140,126, entitled "3D Beverage Container Localizer," filed on Jun. 16, 2008, which are incorporated by reference herein in their entirety.

In one embodiment, the entity detectors 414 or the algorithms 430 are embodied as plug-in software components. The entity detectors 414 or the algorithms 430 can be installed in the mid-level sub-module 222 to expand the capability of the robot 130. The entity detectors 414 or the algorithms 430 can also be removed to make resources available for installation of other components in the mid-level sub-module 222.

Behavior of Robot Based on Panoramic Attention

Referring to FIG. 2, the behavior module 250 plans actions based on the entities detected at the attention module 230. The behavior module 250 may include, among other components, an action executor 258 and an action planner 254. The action planner 254 manages goals of the robot 130, and sends motion plan 294 to the action executor 258. Specifically, the action planner 254 adds, maintains or removes goals of the robot 130 based on events or user commands. To manage the goals, the robot 130 may receive information 292 about entities from the attention entity storage 234 and information 238 about the environment from the global environment storage 236.

The action executor 258 receives the motion plan 294 from the action planner 254 and initiates changes in the robot 130. The robot 130 may operate the effectors 260 as well as change the internal state of the robot 130. To operate the effectors 260, the action executor 258 may issue control commands 296 to the effectors 260. The internal state of robot 130 may include, for example, an idle mode (i.e., the robot 130 does not have active goals to pursue) and an action mode (i.e., the robot 130 has at least one active goal and activates effectors 260 to achieve the goal). The motion plan 294 may prompt the action executor 258 to change the current mode of the robot 130.

In one embodiment, the action executor 258 issues control commands 269 to the effectors 260 to move the robot 130 to gaze at different locations of the environment in the idle mode. In the idle mode, the robot 130 is not conducting any primary tasks. The lack of visible activity may lead people observing the robot 130 to believe that the robot 130 is not functioning. Therefore, in order to indicate liveliness, the robot 130 may move its body even in the idle mode. Instead of moving the robot 130 in a random manner, the movement of the robot 130 in the idle mode is planned to actively map the surrounding environment during the idle mode.

Assume that a policy has been established to limit the movement to panning of the head between pan angle $\phi_{max}$ and $\phi_{min}$ during an idle mode. In this case, a section of the panoramic map from azimuth angle $\phi_{max}$ and $\phi_{min}$ is divided into n bins where the width w of each bin is expressed by the following equation:

$$w = (\phi_{max} - \phi_{min})/n \quad (15)$$

The bounds of bin i are defined as follows:

$$\phi_{min} + i \cdot w, \phi_{min} + (i+1) \cdot w \quad (16)$$

where i=0, ... n−1. The action planner 254 selects bin i with probability $p_i$ expressed by the following equation:

$$p_i = \frac{\max_j f_j - f_i}{\max_j f_j * n - f_{total}} \quad (17)$$

where $f_i$ represents the number of times that the action planner 254 selected bin i for gazing in the current idle mode, $f_{total}$ is the total number of times that the action planner 254 made selection of bins in the current idle mode, and $\max_j f_j$ represents the count for the most often selected bins. By using equation (17) to select the gaze direction, the robot 130 is less likely to gaze at a location that was previously observed many times but is more likely to gaze at a location that was not observed many times. Therefore, the action planner 254 can map entities in the surrounding environment during the idle mode in a manner that appears natural to humans, and also allows systematical sensing of the environment surrounding the robot 130 without ignoring any section of the environment for a prolonged time.

In one embodiment, the action planner 254 identifies a target entity by referring to the mapping information stored in the attention entity storage 234. The attention entity storage 234 stores the entity information. When an event occurs requiring the robot 130 to detect the location of an entity not currently in its sensory field, the action planner 254 determines if the same entity was previously mapped to the panoramic map. If the attention entity storage 234 indicates that the same entity was previously detected at a certain location, then the action planner 254 sends the action plan 294 to activate mechanical components of the robot 130 so that the location enters its sensory field. If the robot 130 detects an event associated with an entity (e.g., if the robot 130 hears a person's name being mentioned in a conversation) but the entity is not currently in its sensory field, then the robot 130 may move its head or body so that its sensory field covers the location at which the entity was previously detected. By accessing the previously stored information about an entity, the robot 130 can quickly plan and take actions to locate the entity, if needed.

In one embodiment, the action planner 254 disregards the previously stored information about the entity if the activation signal of the entity is below a threshold level. If the activation signal drops below a threshold level, the entity is unlikely to be at the same location because of the tendency of the entity to move around. Taking actions to sense the previous location is unlikely to yield any productive result given such tendency, and hence, the robot 130 disregards the previously stored location of the entity and plans actions to search for the entity independent of the previously detected location.

Behavior Based Configuration of Attention Module

In one embodiment, the behavior module 250 sends a message 278 to the attention module 230 to set modes of operation. The message 278 indicates changes in the mode of the robot 130, a current plan to take an action, or a pending action planned to be executed by the robot 130. The sub-modules of the attention module 230 may modify operation to accommodate or adjust to the changes in the mode or actions being executed or being planned by the robot 130.

In one embodiment, any plan to invoke translational movement of the robot 130 (e.g., walking) generates a message 278 causing the top-level sub-module 225 and/or lower level sub-modules 222, 218 to shut down their operation. As the translational movement occurs, the mapping of entities to a panoramic map is likely to change significantly and overload processing demand at the processor 202 as well as result in inaccurate detection of entities due to blurred visual images or noise in other sensor signals. Hence, the attention module 230 is at least partially shut down when the robot 130 undergoes translational movement. After the translation movement ends, the attention module 230 resumes detection of the entities.

In one embodiment, the low-level sub-module 218 may modify its operation based on the message 278. The changes in the operation of the low-level sub-module 218 may include, among others, (i) activation or shutting down of some or all of the feature detectors 318, (ii) changing weights assigned to the feature maps 320 to generate the saliency maps 270, (iii) activation or shutting down of some or all of the saliency map generators 314, (iv) modifying features detected at the feature detectors 318 and (v) modify criteria for selecting the region for processing by the mid-level sub-module 222.

In one embodiment, the mid-level sub-module 222 also changes its operation in response to receiving the message 278. For example, one or more entity detectors 414 associated with detecting human features (e.g., face or hand) may be activated when the robot 130 is taking actions involving interactions with humans whereas one or more entity detectors 414 associated with detecting a certain object (e.g., a beverage can) may be activated when the robot 130 is taking actions to handle the object. By selectively activating the entity detectors 414, more computational resources can be allocated to the entity detectors 414 associated with active actions of the robot 130.

By changing the operations of the attention module 230 in response to the message 278, the processor 202 can allocate more resources to the components (e.g., saliency map generators 314, the feature detectors 318 and entity detectors 414) relevant to current or pending actions of the robot 130 for faster and more reliable processing.

Example Mapping of Panoramic Map

Figure 5A:
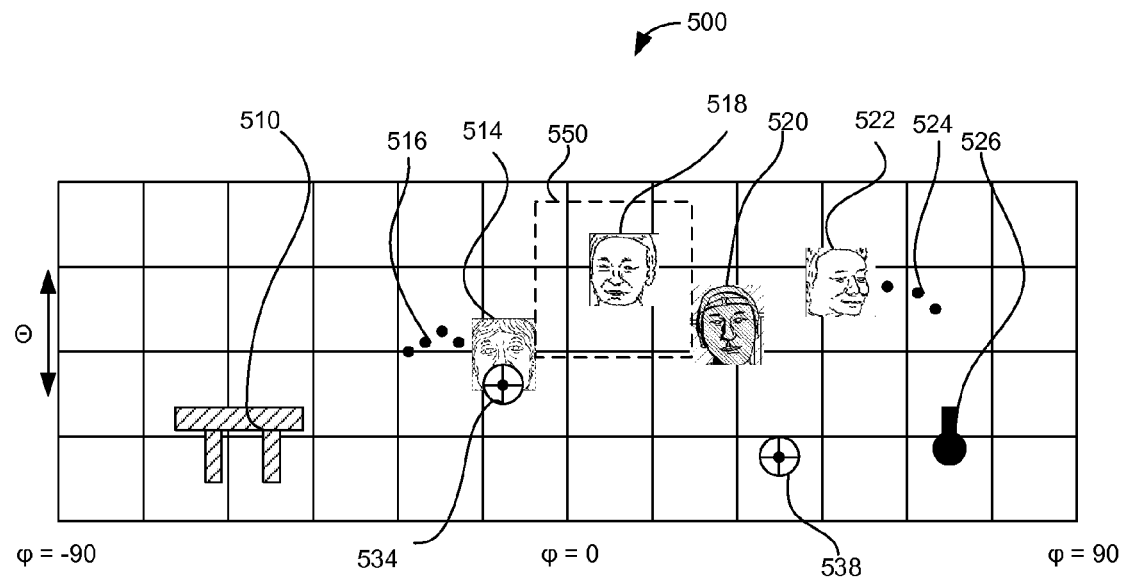
FIG. 5A is a diagram illustrating a panoramic map including detected entities, according to one embodiment of the present invention.

FIG. 5A is a diagram illustrating a panoramic map 500 including detected entities, according to one embodiment of the present invention. The panoramic map 500 is a visual representation of entity information stored in the attention entity storage 234. Although the panoramic map 500 in the robot 130 is actually spherical, FIG. 5A shows is a rectified version of the panoramic map 500. The panoramic map 500 covers a part of the entire coordinate sphere where the azimuth angle φ covers from −90 degrees to 90 degrees. In the example of FIG. 5A, a table 510, four faces 514, 518, 520, 522, a vase 526, and two sound sources 534 and 538 are mapped to the panoramic map 500. Each entity may be identified by a combination of inclination angle (θ) and azimuth angle (φ).

Although images of the faces and objects (i.e., the table 510 and the vase 526) are shown in FIG. 5A for illustrative purposes, the panoramic map 500 as implemented by the attention module 230 stores only high-level information to reduce storage space needed to store information about entities. For example, the attention entity storage 234 (refer to FIG. 2) stores the entity information such as the identities of the faces 514, 518, 520, 522, dimensions of the table 510 and the vase 526 but not the low-level features or images of these entities. By reducing the information stored in the attention entity storage 234, the overall processing speed and efficiency associated with storing and planning the actions can be increased.

The entity information for the table 510, the faces 514, 518, 520, 522 and the vase 526 is obtained by processing images captured by the camera 140. On the other hand, the sound sources 534, 538 are identified by processing acoustic signals captured by the microphones 160. The panoramic map 500 may also include traces 516, 524. The traces 516, 524 represent changes in the locations of entities (e.g., the face 514 and the face 522) with the progress of time.

The camera 140 of the robot 130 has a field of view narrower than the entire coverage of the panoramic map 500. In FIG. 5A, for example, the camera 140 has a field of view represented by box 550. Although the field of view of the camera 140 covers only the face 518 in this example, the attention module 230 retains information about other faces 514, 520, 522, the table 510 and the vase 526 detected from previously captured images. By retaining information about previously detected images in the panoramic map 500, the robot 130 can plan and execute actions based on entities not in a current field of view.

Figure 5B:
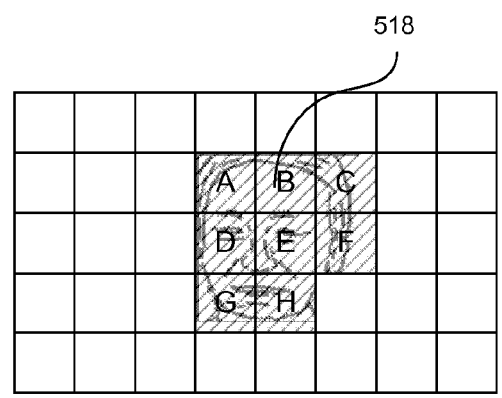
FIG. 5B is discretized sections in a panoramic map indicating the location of a detected entity, according to one embodiment of the present invention.

FIG. 5B is discretized sections in a panoramic map indicating the location of a detected entity, according to one embodiment of the present invention. FIG. 5B shows the face 518 occupying eight discretized blocks A through H of the panoramic map 500. The location of an entity (e.g., the face 518) is identified based on the locations of the discretized blocks (e.g., blocks A through H) occupied by the entity.

The robot 130 can infer various characteristics of the detected entities by analyzing the panoramic map 500. The face 514 appears at a location lower in the panoramic map 500 compared to the other faces 518, 520 and 522. Hence, the robot 130 can infer that the person with face 514 is a shorter person or is sitting. Further, the robot 130 can associate different entity information to the same entity if the locations associated with the entity information are proximate. For example, the face 514 and the sound source 534 are spatially close in the panoramic map 500, and hence, the robot 130 may determine that the face 514 and the sound source 534 belong to the same entity.

In one embodiment, the average coordinate values of the segments A through H may be may be computed and be stored in the attention entity storage 234 in association with the entity information. In one embodiment, the granularity of the discretization differs based on the type of entities.

Example Method of Using Panoramic Attention

Figure 6:
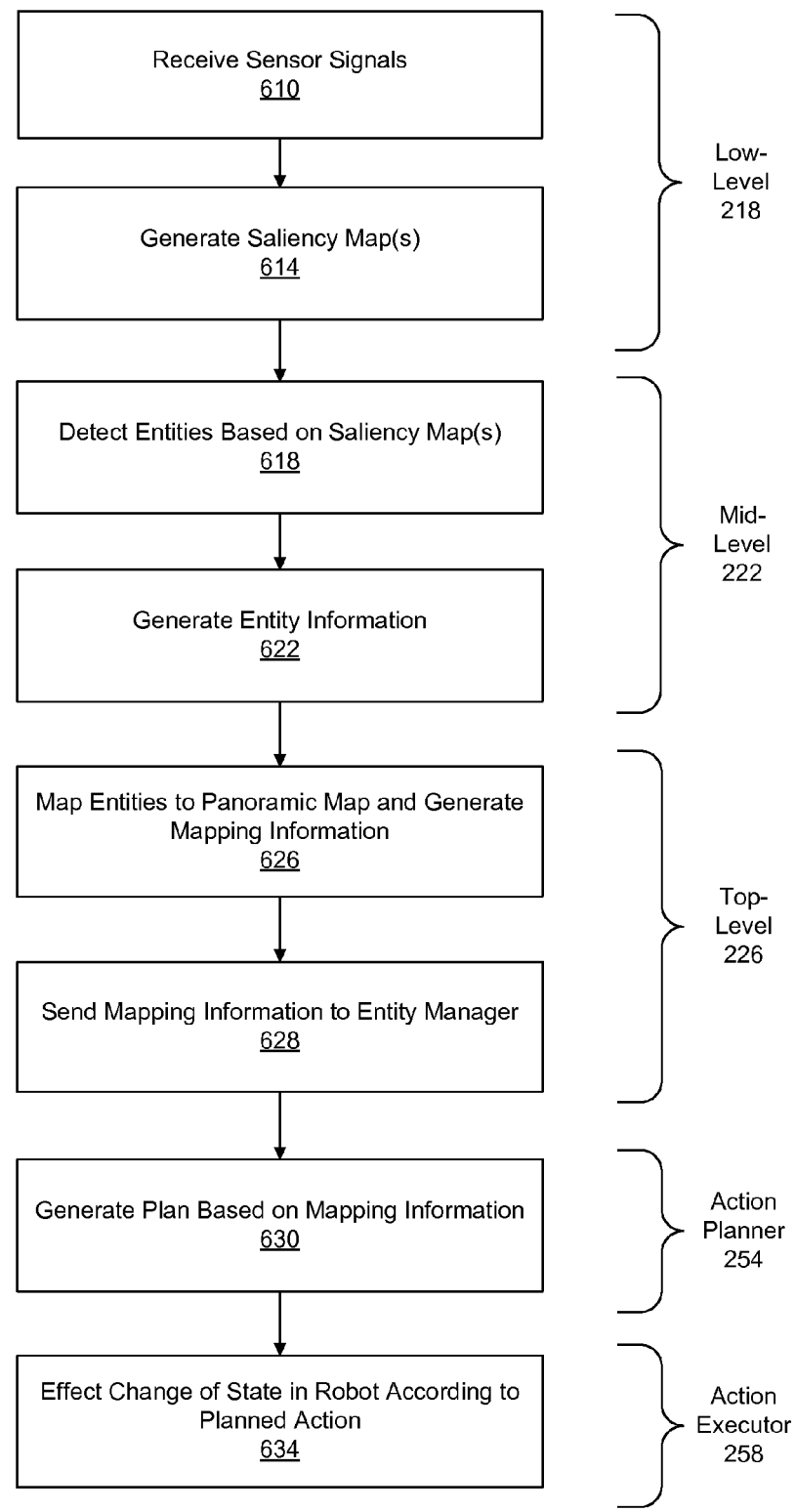
FIG. 6 is a flowchart illustrating a method of operating a humanoid robot using panoramic attention, according to one embodiment of the present invention.

FIG. 6 is a flowchart illustrating a method of operating the robot 130 using panoramic attention, according to one embodiment of the present invention. First, the low-level sub-module 218 receives 610 the sensor signals 266. The sensor signals 266 may be processed by the pre-processors 214 before being provided to the low-level sub-module 218 to enhance detection of features. The low-level sub-module 218 then generates 614 one or more saliency maps 270 by processing the sensor signals 266. In one embodiment, the saliency maps 270 are generated by combining the feature maps 320 generated at the feature detectors 318 of the low-level sub-module 218.

In one embodiment, the mid-level sub-module 222 receives the saliency map 274, determines the ROIs in the sensor signals 266, and detects 618 the entities in the ROIs of the sensor signals 266. Alternatively, the mid-level sub-module 222 may detect the entities by processing ROIs in the saliency map 274. The mid-level sub-module 222 also generates 622 the entity information 274 about the detected entities.

The entity information 274 is sent to the top-level sub-module 226. The top-level sub-module 226 maps 626 the detected entities to the panoramic map 500 to generate the mapping information 288. The mapping information 288 includes the mapped location and the entire entity information 274 of a selected data fields thereof. The top-level sub-module 226 sends 628 the mapping information 288 to the entity manager 230 for storing or updating of the mapping information 288. The entity manager 230 stores the mapping information in the attention entity storage 234 if the mapping information relates to a newly detected entity or updates the mapping information stored in the attention entity storage 234 if the mapping information relates to a previously detected entity.

In one embodiment, the action planner 254 accesses the attention entity storage 234 or the global environment storage 236 to obtain the information 292 about the detected entities and/or the environment information 238. Based on the information 292 about the entities and/or the environment information 238, the action planner 254 generates 630 the action plan 294. The action planner 254 also sends the message 278 to the attention module 230 to set or modify the operation of the attention module 230.

The action planner 254 then sends the action plan 294 to the action executor 258. The action executor 258 then effects 634 changes in the state of the robot 130. The changes are effected, for example, by changing the internal state (e.g., operational mode) of the robot 130 or sending the commands 296 to the effectors 260.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method of operating a robot, comprising:
   extracting features from a sensor signal responsive to receiving the sensor signal from a sensor;
   determining one or more portions of the sensor signal likely to include one or more entities based on the extracted features;
   detecting one or more entities in the sensor signal by processing the one or more portions of the sensor signal;
   generating entity information indicating characteristics of each of the detected entities;
   determining a location of each of the detected entities relative to the robot in a panoramic map at least partially surrounding the robot based on the entity information, the location of each of the detected entities represented by a coordinate in the panoramic map; and
   controlling the robot to perform an action based on the detected entities and the location determined for each of the detected entities.

2. The method of claim 1, wherein the panoramic map identifies locations using a spherical coordinate system.

3. The method of claim 1, further comprising storing a trace of a detected entity representing changes in a location of the detected entity with progress of time.

4. The method of claim 1, wherein each entity is associated with an activation signal representing confidence or probability that the entity information and the location of a previously detected entity remains valid, an activation signal of a previously detected entity decreased with progress of time while a sensory field of the sensor does not cover the previously detected entity.

5. The method of claim 4, wherein a first activation signal for a first type of entity is decreased at a first rate and a second activation signal for a second type of entity is decreased at a second rate.

6. The method of claim 4, wherein controlling the robot comprises causing the robot to move to include a location of an entity previously detected in a sensory field of the sensor responsive to detecting an event associated with the previously detected entity.

7. The method of claim 1, wherein the sensor is an image capturing device and the sensor signal comprises a stream of images.

8. The method of claim 7, wherein the extracted features comprises one or more of light intensity, colors, motions, and orientations in the stream of images.

9. The method of claim 7, further comprising:
   generating feature maps representing relationships between locations and features in an image of the stream of images; and
   generating saliency maps by combining the feature maps, the one or more portions of the sensor signal determined based on the saliency maps.

10. The method of claim 7, further comprising selecting a facing location of the robot based on previous locations the image capturing device faced in response to the robot being placed in an idle mode, a facing location previously selected having a lower probability of being selected.

11. The method of claim 7, further comprising rectifying the image captured by the image capturing device to eliminate spherical distortions in the captured image.

12. The method of claim 7, further comprising:
   extracting features of audio signals received at microphones;
   determining locations of the audio signal;
   extracting features of the audio signals; and
   storing the audio features in association with the locations of the audio signals.

13. The method of claim 1, further comprising
   planning the action to achieve a goal; and
   modifying, based on the goal, at least one of (i) the features extracted from the sensor signal, (ii) one or more portions of the sensor signal selected and (iii) types of entities detected.

14. A robot comprising:
   an attention module comprising,
      a low-level sub-module configured to extract features from a sensor signal responsive to receiving the sensor signal from a sensor;
      a mid-level sub-module configured to:
         determine one or more portions of the sensor signal likely to include one or more entities based on the extracted features,
         detect one or more entities in the sensor signal by processing the one or more portions of the sensor signal; and
         generate entity information indicating characteristics of each of the one or more detected entities; and
      a top-level sub-module configured to determine a location of each of the one or more detected entities relative to the robot; and map the detected entities to locations in a panoramic map at least partially surrounding the robot based on the entity information, the location of each of the detected entities represented by a coordinate in the panoramic map; and a behavior module configured to control the robot to perform an action based on the detected entities and the determined location for each of the detected entities.

15. The robot of claim 14, wherein the attention module further comprises:

an entity storage configured to store, for each of the detected entities, the entity information, the location, and an activation signal representing confidence or probability that the entity information and the location of a previously detected entity remains valid; and an entity manager configured to decrease the activation signal of the previously detected entity with progress of time while a sensory field of the sensor does not cover the previously detected entity.

16. The robot of claim 15, wherein the entity storage is further configured to store a trace of a detected entity, the trace representing changes in a location of the detected entity with the progress of time.

17. The robot of claim 14, wherein the behavior module is configured to cause the robot to move to include a location of an entity previously detected in a sensory field of the sensor responsive to detecting an event associated with the previously detected entity.

18. The robot of claim 14, wherein the sensor is an image capturing device and the sensor signal comprises a stream of images.

19. The robot of claim 18, wherein the extracted features comprises one or more of light intensity, colors, motions, and orientations in the stream of images.

20. The robot of claim 18, wherein the low-level sub-module is further configured to generate feature maps and saliency maps, the feature maps representing relationships between locations and features in an image of the stream of images, the saliency maps generated by combining the feature maps, and the mid-level sub-module is configured to determine the one or more portions of the sensor signal based on the saliency maps.

21. The robot of claim 18, wherein the behavior module is further configured to select a facing location of the robot based on previous locations the image capturing device faced in response to the robot being placed in an idle mode, a previously selected facing location having a lower probability of being selected in current selection.

22. The robot of claim 18, further comprising a pre-processor for rectifying the image captured by the image capturing device to eliminate spherical distortions in the captured image, the rectified image provided to the low-level sub-module for detecting the features.

23. The robot of claim 14, wherein the behavior module is configured to plan the action to achieve a goal, and modify, based on the goal, at least one of: (i) the features extracted from the sensor signal, (ii) one or more portions of the sensor signal selected and (iii) types of entities detected.

24. A computer readable storage medium configured to operate a robot, the computer readable storage medium structured to store instructions, when executed, cause a processor in the robot to:

extract features from a sensor signal responsive to receiving the sensor signal from a sensor;

determine one or more portions of the sensor signal likely to include one or more entities based on the extracted features;

detect one or more entities in the sensor signal by processing the one or more portions of the sensor signal;

generate entity information for each of the detected entities, the entity information indicating characteristics of each of the one or more detected entities;

determine a location of each of the detected entities relative to the robot in a panoramic map at least partially surrounding the robot based on the entity information, the location of each of the detected entities represented by a coordinate in the panoramic map; and control the robot to perform an action based on the detected entities and the location determined for each of the detected entities.

* * * * *